(12) United States Patent
Mitobe et al.

(10) Patent No.: US 12,204,160 B2
(45) Date of Patent: Jan. 21, 2025

(54) PULLING TERMINAL STRUCTURE, PULLING-END-EQUIPPED OPTICAL CABLE, AND METHOD FOR MANUFACTURING PULLING-END-EQUIPPED OPTICAL CABLE

(71) Applicant: Fujikura Ltd., Tokyo (JP)

(72) Inventors: Ryoichi Mitobe, Chiba (JP); Kansei Shindo, Chiba (JP)

(73) Assignee: Fujikura Ltd., Tokyo (JP)

( * ) Notice: Subject to any disclaimer, the term of this patent is extended or adjusted under 35 U.S.C. 154(b) by 260 days.

(21) Appl. No.: 17/790,852

(22) PCT Filed: Feb. 15, 2021

(86) PCT No.: PCT/JP2021/005532
§ 371 (c)(1),
(2) Date: Jul. 5, 2022

(87) PCT Pub. No.: WO2021/192725
PCT Pub. Date: Sep. 30, 2021

(65) Prior Publication Data
US 2023/0063916 A1  Mar. 2, 2023

(30) Foreign Application Priority Data

Mar. 27, 2020  (JP) .................... 2020-058674

(51) Int. Cl.
*G02B 6/54* (2006.01)
*G02B 6/44* (2006.01)
(Continued)

(52) U.S. Cl.
CPC ............. *G02B 6/54* (2013.01); *G02B 6/44* (2013.01); *G02B 6/4471* (2013.01);
(Continued)

(58) Field of Classification Search
CPC .... G02B 6/44–4491; G02B 6/46; G02B 6/47; G02B 6/50–508; G02B 6/54; G02B 6/545
See application file for complete search history.

(56) References Cited

U.S. PATENT DOCUMENTS 2,766,501 A  * 10/1956 Kellems ................. F16G 11/03
                                                  248/62
5,480,203 A   1/1996 Favalora et al.
(Continued)

FOREIGN PATENT DOCUMENTS

CN    102456441 A      5/2012
EP    1180706 A1  *  2/2002 ........... G02B 6/4471
(Continued)

OTHER PUBLICATIONS

Machine translation of EP 1180706 A1. (Year: 2002).*
(Continued)

*Primary Examiner* — Daniel Petkovsek
*Assistant Examiner* — Emma R. Oxford
(74) *Attorney, Agent, or Firm* — Osha Bergman Watanabe & Burton LLP

(57) ABSTRACT

A pulling terminal structure includes: a braided tube that includes a pulling part; a housing tube disposed inside the braided tube and that houses an optical connector; and a reinforcement member disposed inside the braided tube and that reinforces an end part of the housing tube.

9 Claims, 13 Drawing Sheets

(51) Int. Cl.
*G02B 6/46* (2006.01)
*H02G 1/08* (2006.01)
*H02G 15/02* (2006.01)

(52) U.S. Cl.
CPC .............. *G02B 6/4486* (2013.01); *G02B 6/46* (2013.01); *H02G 1/08* (2013.01); *H02G 15/02* (2013.01)

(56) References Cited

U.S. PATENT DOCUMENTS

| | | | | |
|---|---|---|---|---|
| 6,055,350 | A * | 4/2000 | Brown | .................... G02B 6/502 385/100 |
| 11,860,431 | B2 * | 1/2024 | Mitobe | .................. G02B 6/545 |
| 12,025,844 | B2 * | 7/2024 | Mitobe | .................. H01B 13/00 |
| 2005/0111799 | A1 | 5/2005 | Cooke et al. | |
| 2005/0129375 | A1 | 6/2005 | Elkins et al. | |
| 2017/0102504 | A1 * | 4/2017 | Follingstad | ............ G02B 6/406 |
| 2019/0004273 | A1 | 1/2019 | Faulkner et al. | |
| 2022/0283382 | A1 * | 9/2022 | Mitobe | .................... G02B 6/54 |
| 2023/0141383 | A1 * | 5/2023 | Mitobe | .................... G02B 6/46 385/100 |
| 2023/0228962 | A1 * | 7/2023 | Noda | .................... G02B 6/4429 385/100 |

FOREIGN PATENT DOCUMENTS

| | | |
|---|---|---|
| JP | S62134606 A | 6/1987 |
| JP | 02073202 A | 3/1990 |
| JP | 05060922 A | 3/1993 |
| JP | 2005121678 A | 5/2005 |
| JP | 2008501151 A | 1/2008 |
| JP | 2010217316 A | 9/2010 |
| JP | 2014002189 A | 1/2014 |
| WO | WO-2008066782 A2 * | 6/2008 ........... G02B 6/4433 |

OTHER PUBLICATIONS

International Search Report issued in corresponding International Application No. PCT/JP2021/005532 dated Apr. 27, 2021 (8 pages).

* cited by examiner (PRESENT EMBODIMENT)

(FIRST MODIFIED EXAMPLE)

(SECOND MODIFIED EXAMPLE)

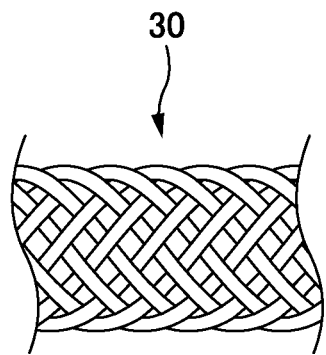
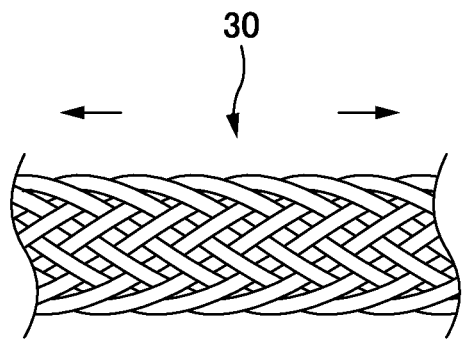
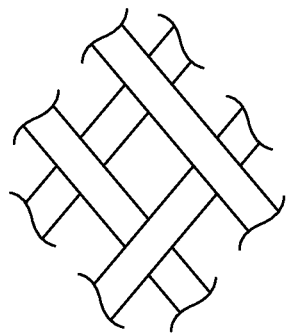
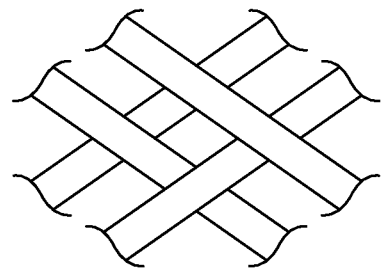
FIG. 4A  FIG. 4B

PULLING TERMINAL STRUCTURE, PULLING-END-EQUIPPED OPTICAL CABLE, AND METHOD FOR MANUFACTURING PULLING-END-EQUIPPED OPTICAL CABLE

TECHNICAL FIELD

The present disclosure relates to a pulling terminal structure, a pulling-end-equipped optical cable, and a method for manufacturing a pulling-end-equipped optical cable.

BACKGROUND

Patent Literature 1 discloses a cable pulling terminal structure used at the time of pulling an optical cable with a pulling device.

PATENT LITERATURE

Patent Literature 1: Japanese Patent Application Laid-open Publication No. 2010-217316

An optical cable can be laid from outside a station building to inside thereof by pulling a pulling part of a pulling-end-equipped optical cable. The laying task inside the station building after pulling-in the optical cable can be facilitated by attaching optical connectors in advance to respective end parts of optical fibers of the optical cable and by housing the optical connectors inside a pulling terminal structure. In this case, however, it is necessary to prevent the housed components (e.g., the optical connectors) housed inside the pulling terminal structure from getting damaged.

SUMMARY

One or more embodiments of the present invention suppress damage to optical connectors inside a pulling terminal structure.

One or more embodiments of the present invention relate to a pulling terminal structure including: a braided tube provided with a pulling part; a housing tube to be arranged inside the braided tube, the housing tube configured to house an optical connector; and a reinforcement member to be arranged inside the braided tube, the reinforcement member configured to reinforce an end part of the housing tube.

One or more embodiments of the present invention relate to a pulling-end-equipped optical cable including: an optical cable including an optical fiber; an optical connector provided to an end part of the optical fiber; a braided tube provided with a pulling part; a housing tube located inside the braided tube, the housing tube configured to house the optical connector; a reinforcement member located inside the braided tube, the reinforcement member configured to reinforce an end part of the housing tube; and a fixing part configured to fix an end part of the braided tube to the optical cable.

One or more embodiments of the present invention relate to a method for manufacturing a pulling-end-equipped optical cable, the method involving: attaching an optical connector to an end part of an optical fiber led out from an optical cable; housing the optical connector inside a housing tube and attaching a reinforcement member to the housing tube; arranging the housing tube and the reinforcement member inside a braided tube having a pulling part; and fixing an end part of the braided tube to the optical cable.

Other features of the present invention will be disclosed in the Description and Drawings as described below.

According to the present invention, it is possible to suppress damage to optical connectors inside a pulling terminal structure.

BRIEF DESCRIPTION OF THE DRAWINGS

FIGS. 4A and 4B are diagrams illustrating characteristics of a braided tube 30.

DETAILED DESCRIPTION

Figure 1A:
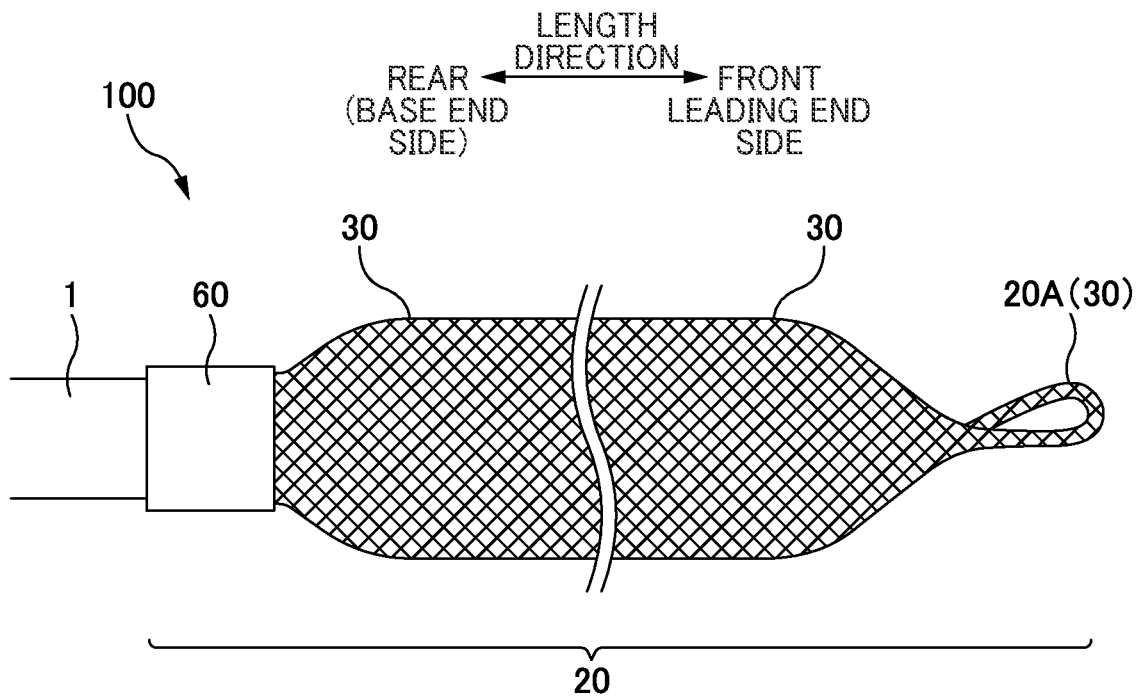
FIG. 1A is a diagram illustrating an outer appearance of a pulling-end-equipped optical cable 100 according to one or more embodiments.

At least the following features are disclosed in the Description and Drawings as described below.

Disclosed is a pulling terminal structure including: a braided tube provided with a pulling part; a housing tube to be arranged inside the braided tube, the housing tube configured to house an optical connector; and a reinforcement member to be arranged inside the braided tube, the reinforcement member configured to reinforce an end part of the housing tube. With this pulling terminal structure, it is possible to suppress deformation of an end part of the housing tube even when tensile force is applied to the braided tube during pulling, and thus, it is possible to suppress damage to optical connectors housed inside the housing tube.

The reinforcement member may have a fitting part configured to be fitted to the housing tube. In this way, the reinforcement member can reinforce the end part of the housing tube.

The reinforcement member may have a step part configured to cover the end part of the housing tube from outside in a length direction. In this way, the end part of the housing tube can be reinforced from outside.

The reinforcement member may have a tapered part that tapers with distance from the housing tube. In this way, it is possible to keep the pulling-end-equipped optical cable from getting caught during puffing.

An outer diameter of the reinforcement member may be larger than an outer diameter of the housing tube. In this way, it is possible to suppress force applied to the housing tube from the braided tube during puffing.

A sealing part may be formed between the housing tube and the reinforcement member. In this way, the inside of the housing tube can be made watertight.

The pulling terminal structure may further include a fixing part configured to fix the braided tube to an optical cable at an end part of the braided tube on an opposite side from an end part thereof where the pulling part is provided. In this way, the braided tube can be retained on the optical cable during puffing.

The fixing part may have a tubular outer circumferential member, and the fixing part may be constituted by sandwiching the end part of the braided tube between the outer circumferential member and the optical cable. In this way, the end part of the braided tube can be fixed to the optical cable.

The fixing part may have an intermediate member, the intermediate member may be arranged between the optical cable and the outer circumferential member, the fixing part may be constituted by sandwiching the end part of the braided tube between the outer circumferential member and the intermediate member, a first adhesive layer may be formed between the optical cable and the intermediate member, and a second adhesive layer may be formed between the intermediate member and the outer circumferential member, and an adhesive force of the second adhesive layer may be greater than an adhesive force of the first adhesive layer. In this way, the adhesive layer is less likely to remain on the outer circumference of the optical cable at the time of disassembly.

The pulling terminal structure may further include a cord member arranged between the optical cable and the intermediate member. In this way, the intermediate member can be easily removed from the optical cable at the time of disassembly after pulling.

Also disclosed is a pulling-end-equipped optical cable including: an optical cable including an optical fiber; an optical connector provided to an end part of the optical fiber; a braided tube provided with a pulling part; a housing tube located inside the braided tube, the housing tube configured to house the optical connector; a reinforcement member located inside the braided tube, the reinforcement member configured to reinforce an end part of the housing tube; and a fixing part configured to fix an end part of the braided tube to the optical cable. With this puffing-end-equipped optical cable, it is possible to suppress deformation of an end part of the housing tube even when tensile force is applied to the braided tube during pulling, and thus, it is possible to suppress damage to optical connectors housed inside the housing tube.

Also disclosed is a method for manufacturing a pulling-end-equipped optical cable, the method involving: attaching an optical connector to an end part of an optical fiber led out from an optical cable; housing the optical connector inside a housing tube and attaching a reinforcement member to the housing tube; arranging the housing tube and the reinforcement member inside a braided tube having a pulling part; and fixing an end part of the braided tube to the optical cable. With this method for manufacturing a pulling-end-equipped optical cable, it is possible to manufacture a pulling-end-equipped optical cable capable of suppressing deformation of an end part of the housing tube.

Figure 1B:
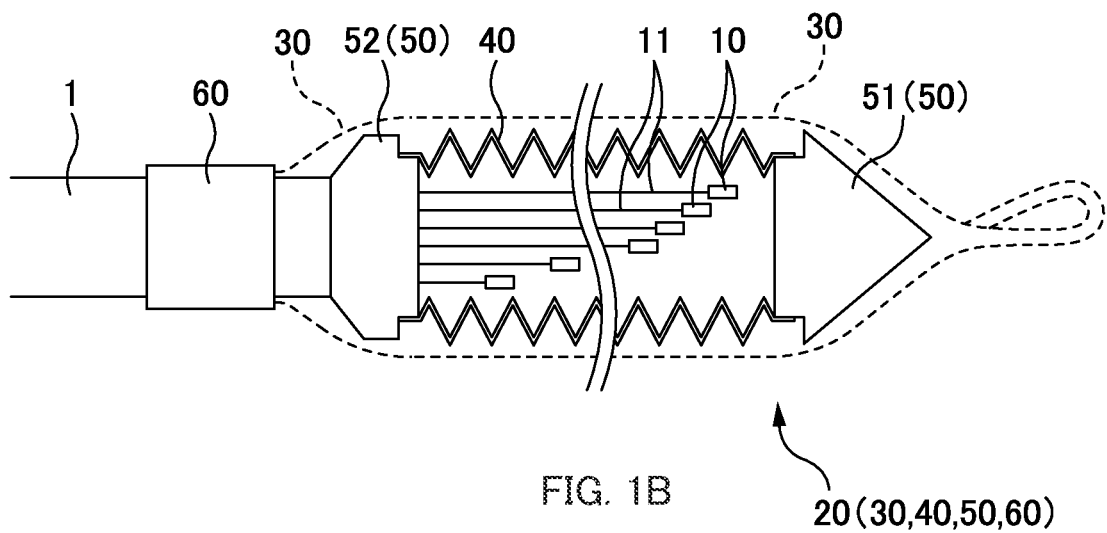
FIG. 1B is a diagram illustrating an inner structure of the pulling-end-equipped optical cable 100 according to one or more embodiments.

Configuration of Pulling-End-Equipped Optical Cable 100:

FIG. 1A is a diagram illustrating an outer appearance of a pulling-end-equipped optical cable 100 according to one or more embodiments. FIG. 1B is a diagram illustrating an inner structure of the pulling-end-equipped optical cable 100 according to one or more embodiments.

In the following description, as illustrated in FIG. 1A, the length direction of the pulling-end-equipped optical cable 100 is referred to as "front-rear direction", wherein the leading end side as viewed from the pulling-end-equipped optical cable 100 is referred to as "front", and the opposite side is referred to as "rear". The front side may be referred to as "leading end side", and the rear side may be referred to as "base end side".

Figure 13:
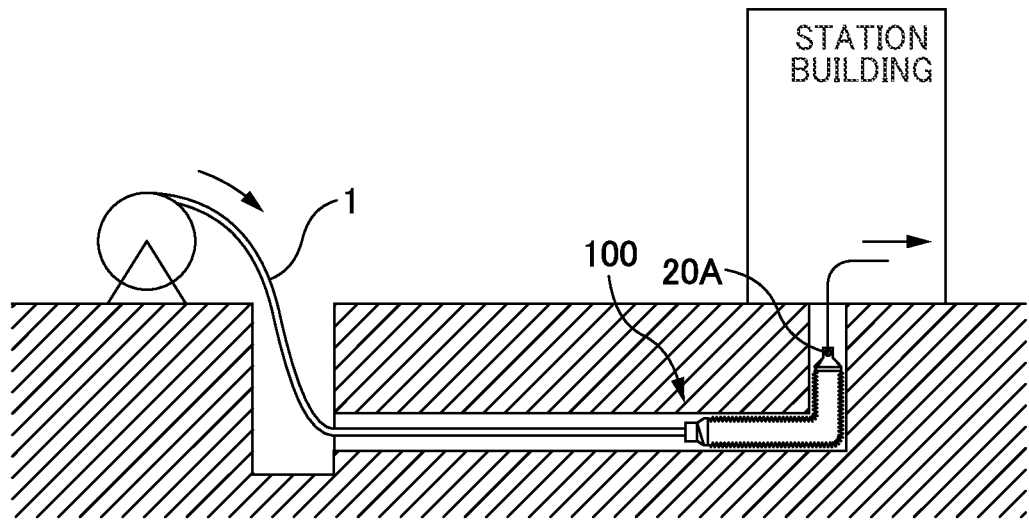
FIG. 13 is a diagram illustrating how an optical cable is laid from outside a station building to inside thereof by pulling a pulling part of a pulling-end-equipped optical cable.

The pulling-end-equipped optical cable 100 is an optical cable having a pulling part at an end part thereof. As illustrated in FIG. 13, an optical cable 1 can be laid from outside a station building to inside thereof by pulling the pulling part of the pulling-end-equipped optical cable 100. The pulling-end-equipped optical cable 100 includes an optical cable 1 and a terminal structure 20.

Figure 2:
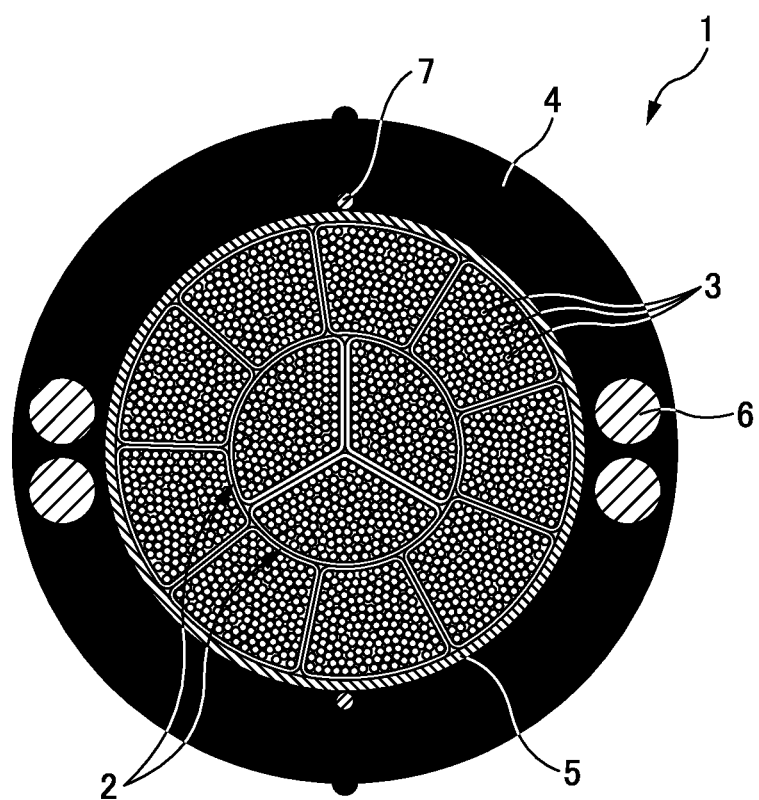
FIG. 2 is a diagram illustrating an optical cable 1.

FIG. 2 is a diagram illustrating the optical cable 1.

The optical cable 1 is a cable that houses a multitude of optical fibers 3 inside an outer sheath 4. The optical cable 1 includes a plurality of optical fiber units 2, a wrapping tape 5, and the aforementioned outer sheath 4. The optical fiber unit 2 is a unit in which a plurality of optical fibers 3 are bundled. Herein, the optical fiber unit 2 is constituted by bundling a plurality of intermittently connected optical fiber ribbons with a bundling member. Note that the optical cable 1 of one or more embodiments includes 288 optical fiber ribbons (optical fiber tapes), each constituted by 12 optical fibers 3, and hence includes a total of 3,456 optical fibers 3. The number of optical fiber ribbons and optical fibers 3, however, is not limited to the above. The plurality of optical fiber units 2 are housed inside the outer sheath 4 in a state wrapped by the wrapping tape 5. Tension members 6 and rip cords 7 are embedded within the outer sheath 4.

A multitude of optical fibers 3 (optical fiber ribbons) extend out from a lead-out part of the optical cable 1. In one or more embodiments, 288 optical fiber ribbons extend out from the lead-out part of the optical cable 1. (Note that, in FIG. 1B, the number of optical fiber ribbons is reduced for the sake of brevity.) An optical connector 10 is attached to an end part of the optical fibers 3. The optical connector 10 of one or more embodiments is constituted by a 24-fiber MPO connector. Hence, 144 optical connectors 10 are attached in the optical cable 1 of one or more embodiments. (Note that, in FIG. 1B, the number of optical connectors 10 is reduced for the sake of brevity.) The optical fibers 3 (optical fiber ribbons) leading out from the optical cable 1 are inserted through a protection tube (not illustrated). In the description below, the structure extending out from the lead-out part of the optical cable 1 (i.e., the plurality of optical fibers 3 leading out from the optical cable 1 and the plurality of optical connectors 10 provided to the respective end parts of the optical fibers 3) may be referred to as "connector unit".

The terminal structure 20 is a structure provided to a terminal of the optical cable 1. The terminal structure 20 of one or more embodiments is a pulling terminal structure having a pulling part 20A. The terminal structure 20 of one or more embodiments is a structure that enables pulling of the optical cable 1 while housing the connector units (i.e., the plurality of optical fibers 3 leading out from the optical cable 1 and the plurality of optical connectors 10 provided to the respective end parts of the optical fibers 3). The pulling part 20A is a section for pulling the optical cable 1. The terminal structure 20 includes a braided tube 30, a housing tube 40, a reinforcement member 50, and a fixing part 60.

The braided tube 30 is a member made by braiding fiber members in a tube shape. Stated differently, the braided tube 30 is a tube made by braiding fiber members in a mesh form. The fiber members constituting the braided tube 30 may be, for example, resin fibers or metal wiring (wires). The leading end of the braided tube 30 is provided with the pulling part 20A. When the pulling part 20A is pulled, a large tensile force is applied to the braided tube 30, but the braided tube 30, which is constituted by a multitude of fiber members, has sufficient durability against such tensile force. Further, the braided tube 30 has a certain degree of flexibility that makes bending possible in an underground conduit as illustrated in FIG. 13.

The housing tube 40 and the reinforcement member 50 are located inside the braided tube 30. The braided tube 30 functions to protect the housing tube 40 and the reinforcement member 50 from friction with the inner wall surface of an underground conduit as illustrated in FIG. 13. Also, the end part of the optical cable 1 is housed inside the braided tube 30. The braided tube 30's end part on the base end side is fixed to the optical cable 1 by the fixing part 60. The braided tube 30's end part on the leading end side is provided with the pulling part 20A. The pulling part 20A is a section configured to be pulled with a pulling device such as a winch. The pulling part 20A may be referred to as "pulling end".

Figure 3A:
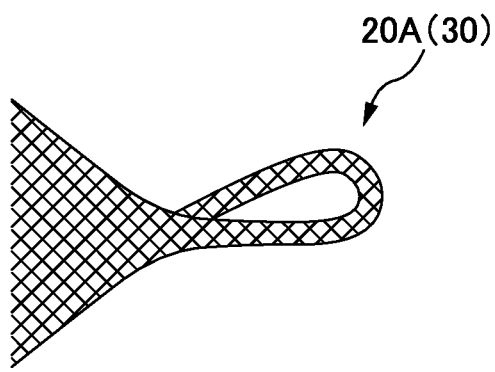
FIG. 3A is a diagram illustrating a pulling part 20A according to one or more embodiments.

FIG. 3A is a diagram illustrating the pulling part 20A according to one or more embodiments. The pulling part 20A of one or more embodiments is constituted by forming an excessive-length portion at the leading end of the braided tube 30 in a ring shape. That is, in one or more embodiments, the pulling part 20A is formed integrally with the braided tube 30. Note, however, that the pulling part 20A is not limited to such a configuration.

Figure 3B:
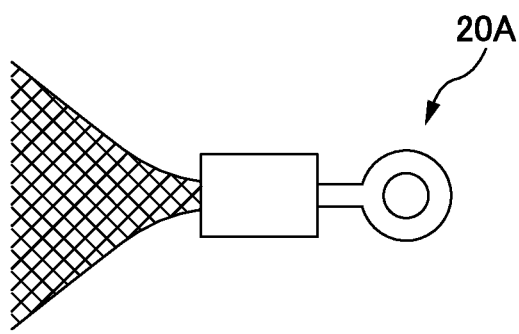
FIG. 3B illustrates a pulling part 20A according to a first modified example.

FIG. 3B illustrates a pulling part 20A according to a first modified example. The pulling part 20A of the first modified example is constituted by attaching a member (e.g., a metal member) having a ring part to the braided tube 30. As in this example, the pulling part 20A may be constituted by a separate member from the braided tube 30.

Figure 3C:
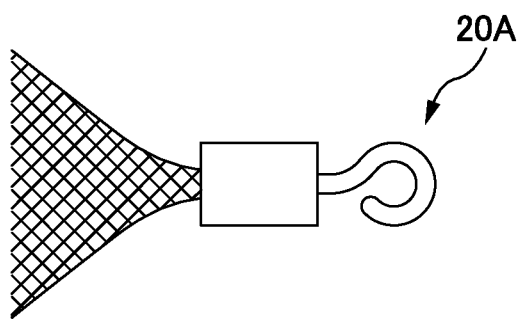
FIG. 3C illustrates a pulling part 20A according to a second modified example.

FIG. 3C illustrates a pulling part 20A according to a second modified example. The pulling part 20A of the second modified example is constituted by attaching a member having a hook part to the braided tube 30. As in this example, the shape of the pulling part 20A is not limited to a ring shape.

FIGS. 4A and 4B are diagrams illustrating characteristics of the braided tube 30. The braided tube 30 is a tube that is stretchable/contractible in the length direction. When the braided tube 30 is made to stretch/contract in the length direction, the intersecting angle between the fiber members changes, and thus, the diameter of the tube changes. More specifically, when the braided tube 30 is made to contract in the length direction, the diameter of the braided tube 30 increases (see FIG. 4A). On the other hand, when the braided tube 30 is stretched in the length direction, the diameter of the braided tube 30 decreases (see FIG. 4B). Hence, when tensile (pulling) force is applied to the braided tube 30, the diameter of the braided tube decreases as illustrated in FIG. 4B.

The housing tube 40 is a cylindrical (tubular) member configured to house the optical connectors 10. The housing tube 40 of one or more embodiments houses the connector units (the plurality of optical fibers 3 and optical connectors 10) extending out from the lead-out part of the optical cable 1. The housing tube 40 functions to protect the connector units. In one or more embodiments, the housing tube 40 is constituted by a corrugated pipe. Note, however, that the housing tube 40 may be constituted by a type of tube/pipe different from the corrugated pipe, so long as the housing tube has a certain degree of flexibility that makes bending possible in an underground conduit as illustrated in FIG. 13. The housing tube 40 is located inside the braided tube 30.

Figure 5A:
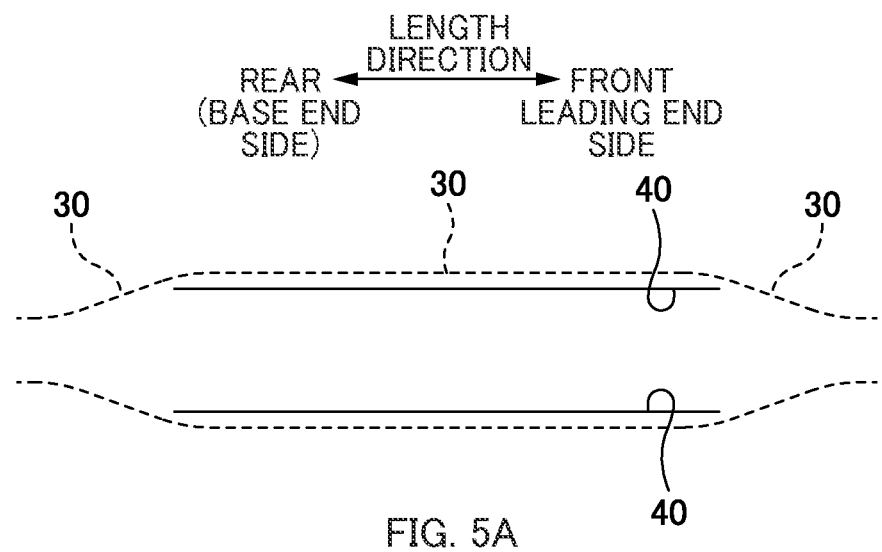
FIGS. 5A and 5B are reference diagrams illustrating a structure constituted by a braided tube 30 and a housing tube 40.
Figure 5B:
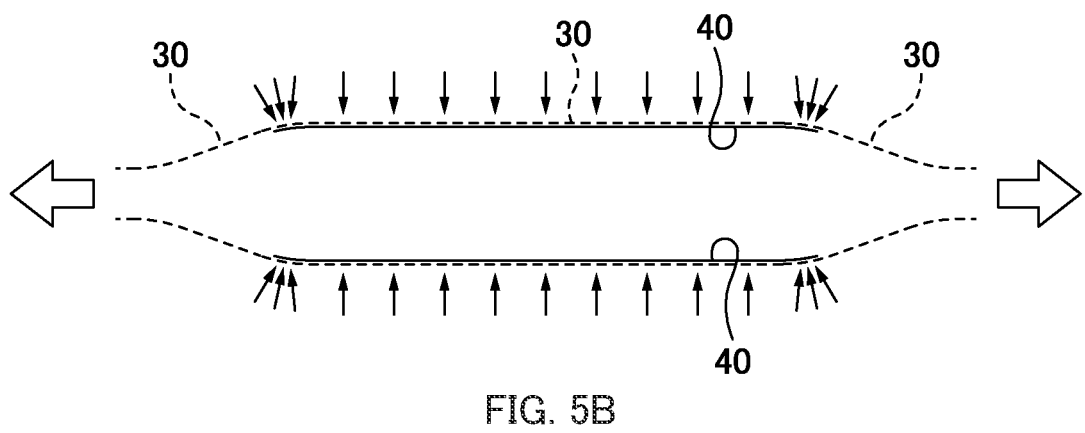

FIGS. 5A and 5B are reference diagrams illustrating a structure constituted by the braided tube 30 and the housing tube 40.

The housing tube 40, which is constituted by a corrugated pipe, is relatively weak against tensile force. In one or more embodiments, however, the tensile force during pulling does not directly act on the housing tube 40, but instead directly acts on the braided tube 30. Hence, according to one or more embodiments, it is possible to suppress destruction of the housing tube 40 caused by application of tensile force on the housing tube 40.

On the other hand, the braided tube 30 has a characteristic of being reduced in diameter when subjected to tensile force (see FIG. 4B). Hence, when the pulling part 20A is being pulled, the housing tube 40 is subjected to a radially-inward compression force from the braided tube 30 (see FIG. 5B). Normally, the housing tube 40, which is constituted by a corrugated pipe, is relatively robust against radial force applied from outside. However, the end parts of the housing tube 40 receive force also from the braided tube 30 whose diameter has become narrow on the outside in the length direction, and are thus susceptible to concentrated force. As a result, as illustrated in FIG. 5B, there is a possibility that the end parts of the housing tube 40 may deform. Particularly, in cases where the housing tube 40, which is constituted by a corrugated pipe, is reduced in diameter, the strength of the housing tube 40 also tends to be reduced. Thus, there is a possibility that the end parts of the housing tube 40 may get destroyed by the force applied from the braided tube. Deformation of the end parts of the housing tube 40 may cause damage to the optical connectors 10 housed inside. So, in one or more embodiments, a reinforcement member 50 is attached to each end part of the housing tube 40 to suppress deformation of the end parts of the housing tube 40.

The reinforcement member 50 is a member configured to reinforce an end part of the housing tube 40. The present reinforcement member 50 includes a front member 51 and a rear member 52.

Figure 6A:
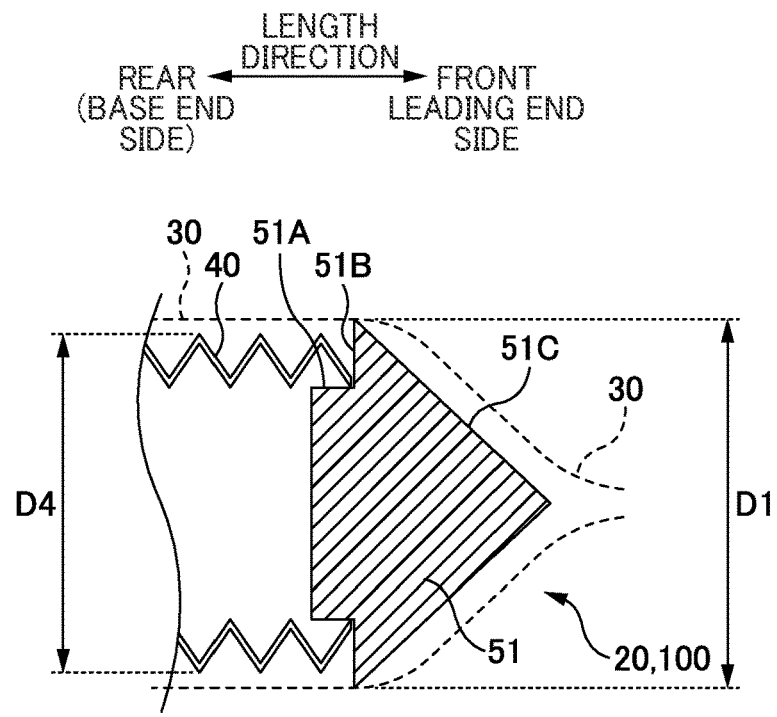
FIG. 6A is a diagram illustrating a front member 51.

FIG. 6A is a diagram illustrating the front member 51. The front member 51 is a member to be attached to the housing tube 40's end part on the leading end side (front side). The front member 51 is a member configured to reinforce the leading-end-side end part of the housing tube 40, and is a member configured to suppress deformation of the leading-end-side end part of the housing tube 40. The front member 51 includes a fitting part 51A, a step part 51B, and a tapered part 51C.

The fitting part 51A is a section configured to be fitted to the housing tube 40. The fitting part 51A is provided in a rear part of the front member 51, and is configured to be fitted to the leading-end-side end part of the housing tube 40. The present fitting part 51A is fitted inside the housing tube 40. The fitting part 51A thus reinforces the end part of the housing tube 40 from inside. By providing the front member 51 with the fitting part 51A, the end part of the housing tube 40 can be reinforced from inside by the fitting part 51A, and thus, deformation of the housing tube 40 during pulling can be suppressed.

The step part 51B is a section located more toward the leading end side with respect to the fitting part 51A, and is a section that protrudes radially outward with respect to the outer circumference of the fitting part 51A. In a state where the front member 51 is attached to the housing tube 40, the step part 51B is located on the front side of the front edge of the housing tube 40. Stated differently, the step part 51B covers the front edge of the housing tube 40 from the front side. In this way, the step part 51B can receive force from the braided tube 30 whose diameter has become narrow outside the housing tube 40 in the length direction. Stated differently, the step part 51B is configured to reinforce the end part of the housing tube 40 from outside in the length direction. By providing the front member 51 with the step part 51B, the end part of the housing tube 40 can be reinforced from outside in the length direction, and thus, deformation of the housing tube 40 during pulling can be suppressed.

The step part 51B engages with the leading-end-side end part of the housing tube 40. Since the step part 51B engages with the end part of the housing tube 40, it is possible to prevent the front member 51 from falling out (i.e., prevent the front member 51 from entering the interior of the housing tube 40). Note that the step part 51B does not have to be provided on the leading end side of the fitting part 51A. Even without the step part 51B, deformation of the housing tube 40 during pulling can be suppressed by reinforcing the end part of the housing tube 40 with the fitting part 51A.

The tapered part 51C is a section located more toward the leading end side with respect to the fitting part 51A (and the step part 51B), and is a section that tapers toward the leading end side. Stated differently, the tapered part 51C is a section that tapers with distance from the housing tube 40. If the front member 51 has no tapered part 51C, the front edge of the reinforcement member 50 will form a corner (sharp edge) in the braided tube 30 when the reinforcement member 50 (as well as the housing tube 40) is arranged inside the braided tube 30. This corner may get caught in an underground conduit during puffing. In contrast, in one or more embodiments, the tapered part 51C is provided to the leading end side of the front member 51, and thus, it is possible to keep the pulling-end-equipped optical cable 100 from getting caught during pulling.

As illustrated in FIG. 6A, in one or more embodiments, the outer diameter D1 of the front member 51 is larger than the outer diameter D4 of the housing tube 40. Note that the outer diameter D1 of the front member 51 is the maximum diameter of the front member 51. In this example, the outer diameter D1 of the front member 51 is the maximum diameter at the step constituting the step part 51B, or the maximum diameter of the tapered part 51C. Note, however, that a section other than the step part 51B or the tapered part 51C may constitute the outer diameter D1 of the front member 51. By making the outer diameter D1 of the front member 51 greater than the outer diameter D4 of the housing tube 40 as in one or more embodiments, the braided tube 30 is less likely to contact the housing tube 40 during pulling. Hence, it is possible to suppress force applied to the housing tube 40 from the braided tube 30 during pulling, and thus suppress deformation of the housing tube 40 during puffing. Note, however, that the outer diameter D1 of the front member 51 may be substantially the same as the outer diameter D4 of the housing tube 40, or may be smaller than the outer diameter D4 of the housing tube 40.

A waterproofing sealing treatment is applied between the front member 51 and the end part of the housing tube 40. Stated differently, a sealing part (not illustrated in FIG. 6A) is formed so as to fill the gap between the front member 51 and the housing tube 40. For example, the sealing part is formed in at least one of (i.e., in either one or both of) an interface between the fitting part 51A of the front member 51 and the housing tube 40 and/or an interface between the step part 51B of the front member 51 and the front edge of the housing tube 40. In this way, the inside of the housing tube 40 can be made watertight, and thus, the optical connectors 10 housed inside the housing tube 40 can be waterproofed.

Figure 7:
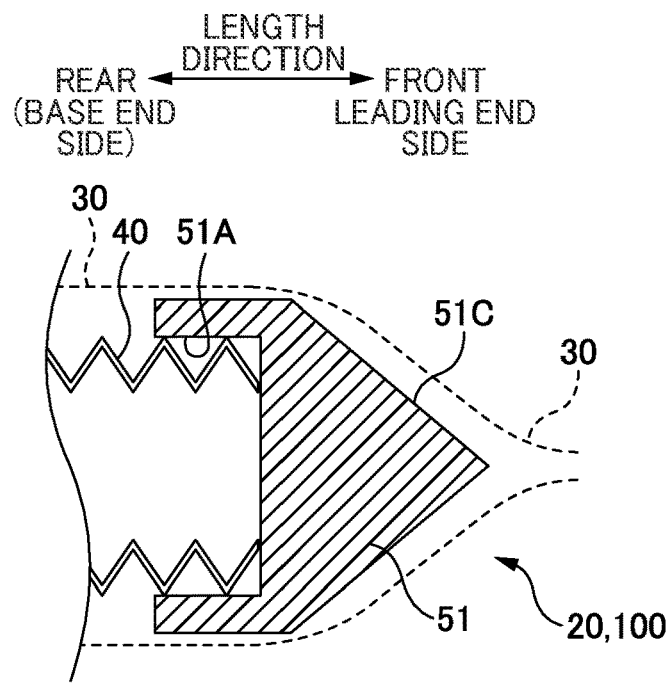
FIG. 7 is a diagram illustrating a modified example of a front member 51.

FIG. 7 is a diagram illustrating a modified example of a front member 51. In the modified example, the fitting part 51A is fitted outside the housing tube 40. Thus, in the modified example, the fitting part 51A reinforces the end part of the housing tube 40 from outside. Also in the modified example, by providing the front member 51 with the fitting part 51A, the end part of the housing tube 40 can be reinforced by the fitting part 51A, and thus, deformation of the housing tube 40 during pulling can be suppressed. Note, however, that in the modified example, since the fitting part 51A reinforces the end part of the housing tube 40 from outside, this leads to an increase in the outer dimension of the front member 51 and also an increase in the outer diameter of the pulling-end-equipped optical cable 100. In contrast, with a configuration wherein the fitting part 51A is fitted inside the housing tube 40 as illustrated in FIG. 6A, the outer dimension of the front member 51 can be made smaller compared to the modified example, and thus, the outer diameter of the pulling-end-equipped optical cable 100 can also be reduced.

Figure 6B:
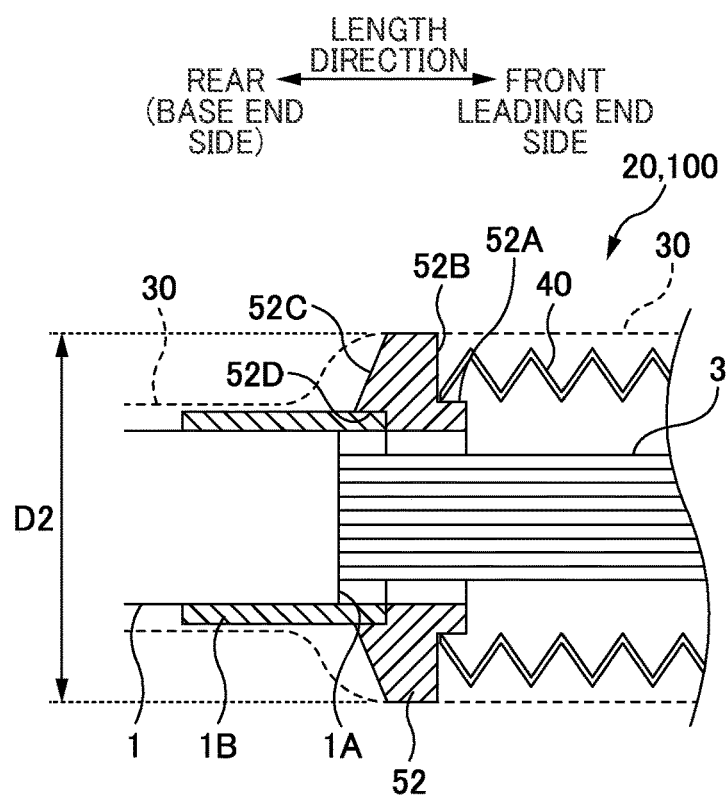
FIG. 6B is a diagram illustrating a rear member 52.

FIG. 6B is a diagram illustrating the rear member 52. The rear member 52 is a member to be attached to the housing tube 40's end part on the base end side (rear side). The rear member 52 is a member configured to reinforce the base-end-side end part of the housing tube 40, and is a member configured to suppress deformation of the base-end-side end part of the housing tube 40.

The rear member 52 is a tubular member, and the multitude of optical fibers 3 leading out from the optical cable 1 are inserted therethrough. The rear member 52 is configured as a halved structure. More specifically, the rear member 52 is constituted by two members (a first rear member and a second rear member) and is made into a tubular form by assembling the two members of the halved structure. If the rear member 52 is constituted by a single component, it will be necessary to pass the connector units (the optical fibers 3, the optical connectors 10, etc.) through the tubular rear member 52 at the time of manufacturing the pulling-end-equipped optical cable 100. Further, if the rear member 52 is constituted by a single component, it will be difficult to remove the rear member 52 at the time of disassembling the terminal structure 20 to take out the internally-located optical connectors 10 after pulling the pulling-end-equipped optical cable 100. In contrast, constituting the rear member 52 as a halved structure can facilitate manufacture and disassembly of the pulling-end-equipped optical cable 100. The rear member 52 includes a fitting part 52A, a step part 52B, a tapered part 52C, and an attachment part 52D.

The fitting part 52A is a section configured to be fitted to the housing tube 40. The fitting part 52A is provided in a front part of the rear member 52, and is configured to be fitted to the base-end-side (rear-side) end part of the housing tube 40. The present fitting part 52A is fitted inside the housing tube 40. The fitting part 52A thus reinforces the end part of the housing tube 40 from inside. By providing the rear member 52 with the fitting part 52A, the end part of the housing tube 40 can be reinforced from inside by the fitting part 52A, and thus, deformation of the housing tube 40 during pulling can be suppressed. Note that, as with the fitting part 51A of the front member 51 illustrated in FIG. 7, the fitting part 52A of the rear member 52 may be configured to be fitted to the outside of the housing tube 40.

The step part 52B is a section located more toward the base end side with respect to the fitting part 52A, and is a section that protrudes radially outward with respect to the outer circumference of the fitting part 52A. In a state where the rear member 52 is attached to the housing tube 40, the step part 52B is located on the rear side of the rear edge of the housing tube 40. Stated differently, the step part 52B covers the rear edge of the housing tube 40 from the rear side. By providing the rear member 52 with the step part 52B, the end part of the housing tube 40 can be reinforced from outside in the length direction, and thus, deformation of the housing tube 40 during pulling can be suppressed. Further, since the step part 52B engages with the end part of the housing tube 40, it is possible to prevent the rear member 52 from falling out (i.e., prevent the rear member 52 from entering the interior of the housing tube 40). Note that the rear member 52 does not have to include the step part 52B. Even without the step part 52B, deformation of the housing tube 40 during pulling can be suppressed by reinforcing the end part of the housing tube 40 with the fitting part 52A.

A waterproofing sealing treatment is applied also between the rear member 52 and the end part of the housing tube 40. Stated differently, a sealing part (not illustrated in FIG. 6B) is formed so as to fill the gap between the rear member 52 and the housing tube 40. For example, the sealing part is formed in at least one of (i.e., in either one or both of) an interface between the fitting part 52A of the rear member 52 and the housing tube 40 and/or an interface between the step part 52B of the rear member 52 and the rear edge of the housing tube 40. In this way, the inside of the housing tube 40 can be made watertight, and thus, the optical connectors 10 housed inside the housing tube 40 can be waterproofed.

The tapered part 52C is a section located more toward the base end side with respect to the fitting part 52A (and the step part 52B), and is a section that tapers toward the base end side. Like the tapered part 51C of the front member 51, the tapered part 52C of the rear member 52 is also a section that tapers with distance from the housing tube 40. In one or more embodiments, by providing the tapered part 52C to the base end side of the rear member 52, it is possible to keep the pulling-end-equipped optical cable 100 from getting caught when the pulling-end-equipped optical cable 100 is pulled back in the opposite direction.

As illustrated in FIG. 6B, in one or more embodiments, the outer diameter D2 of the rear member 52 is larger than the outer diameter D4 of the housing tube 40. Note that the outer diameter D2 of the rear member 52 is the maximum diameter of the rear member 52. In this example, the outer diameter D2 of the rear member 52 is the maximum diameter at the step constituting the step part 52B, or the maximum diameter of the tapered part 52C. Note, however, that a section other than the step part 52B or the tapered part 52C may constitute the outer diameter D2 of the rear member 52. By making the outer diameter D2 of the rear member 52 greater than the outer diameter D4 of the housing tube 40 as in one or more embodiments, the braided tube 30 is less likely to contact the housing tube 40 during pulling. Hence, it is possible to suppress force applied to the housing tube 40 from the braided tube 30 during pulling, and thus suppress deformation of the housing tube 40 during pulling. Note, however, that the outer diameter D2 of the rear member 52 may be substantially the same as the outer diameter D4 of the housing tube 40, or may be smaller than the outer diameter D4 of the housing tube 40.

The attachment part 52D is a section configured to attach the rear member 52 to the optical cable 1. The housing tube 40 will thus be attached to the optical cable 1 via the attachment part 52D. In one or more embodiments, a tubular member 1B is fixed to the lead-out part 1A of the optical cable 1, and by fitting the attachment part 52D to the tubular member 1B, the rear member 52 is attached to the optical cable 1. Stated differently, in one or more embodiments, the rear member 52 is attached indirectly to the optical cable 1. Note, however, that the attachment part 52D may be attached directly to the optical cable 1. By providing the rear member 52 with the attachment part 52D, the reinforcement member 50 for reinforcing the housing tube 40 can also be provided with the function of attaching the housing tube 40 to the optical cable 1. Thus, the size of the terminal structure 20 can be reduced. Note, however, that an attachment member for attaching the housing tube 40 to the optical cable 1 may be provided as a separate component from the reinforcement member 50 for reinforcing the housing tube 40.

In one or more embodiments, the attachment part 52D is fitted to the outside of the tubular member 1B. If the attachment part 52D is fitted to the inside of the tubular member 1B, the inner diameter of the tubular rear member 52 will become narrow, making it difficult to arrange (insert) the multitude of optical fibers 3 within the rear member 52. In contrast, by fitting the attachment part 52D to the outside of the tubular member 1B, the inner diameter of the tubular rear member 52 can be widened.

A waterproofing sealing treatment is applied also between the attachment part 52D and the tubular member 1B. Stated differently, a sealing part (not illustrated in FIG. 6B) is formed so as to fill the gap between the attachment part 52D and the tubular member 1B. Note that, in cases where the attachment part 52D is attached directly to the lead-out part 1A of the optical cable 1, the sealing part will be formed between the attachment part 52D and the lead-out part 1A.

The fixing part 60 is a section configured to fix an end part (base-end-side end part) of the braided tube 30 to the optical cable 1. When the pulling part 20A is pulled, pulling force will be applied to the fixing part 60 via the braided tube 30. The fixing part 60 is provided to the outer circumference of the optical cable 1, and has a function of retaining the end part (base-end-side end part) of the braided tube 30 to the optical cable 1.

Figure 8:
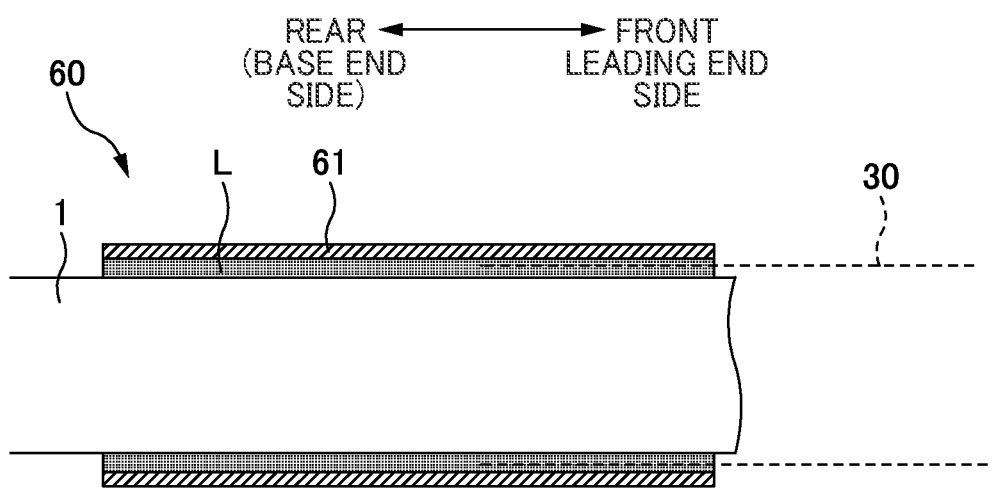
FIG. 8 is a diagram illustrating first embodiments of a fixing part 60.

FIG. 8 is a diagram illustrating first embodiments of the fixing part 60. The fixing part 60 has an outer circumferential member 61. The outer circumferential member 61 is a tubular member, and is arranged so as to cover the optical cable 1 and the braided tube 30 from outside. For example, the outer circumferential member 61 is constituted by a heat-shrinkable tube. The braided tube 30 is arranged between the outer circumferential member 61 and the optical cable 1 (outer sheath 4). An adhesive layer L is formed between the inner circumferential surface of the outer circumferential member 61 and the braided tube 30, between the outer circumferential member 61 and the optical cable 1, and between the braided tube 30 and the optical cable 1. The adhesive layer L can be formed, for example, by applying a hot-melt adhesive in advance to the inner circumferential surface of the heat-shrinkable tube, and heating the heat-shrinkable tube in a state where the end part of the braided tube 30 is arranged between the heat-shrinkable tube (outer circumferential member 61) and the optical cable 1. The heat-shrinkable tube (outer circumferential member 61), which has contracted by being heated, sandwiches the braided tube 30 between it and the optical cable 1, and thereby, the end part of the braided tube 30 is fixed to the optical cable 1.

In case of the fixing part 60 of the first embodiments, residue of the adhesive layer L tends to remain on the outer circumference of the optical cable 1 at the time of disassembly of the pulling-end-equipped optical cable 100. In the following second embodiments, the fixing part 60 has a structure wherein the adhesive layer is less likely to remain on the outer circumference of the optical cable 1.

Figure 9A:
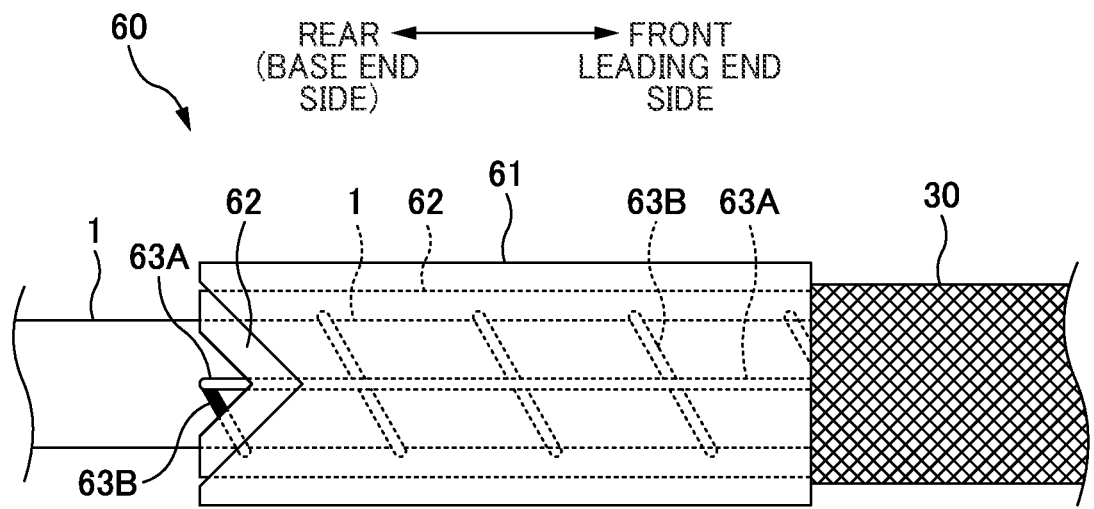
FIGS. 9A and 9B are diagrams illustrating second embodiments of a fixing part 60.
Figure 9B:
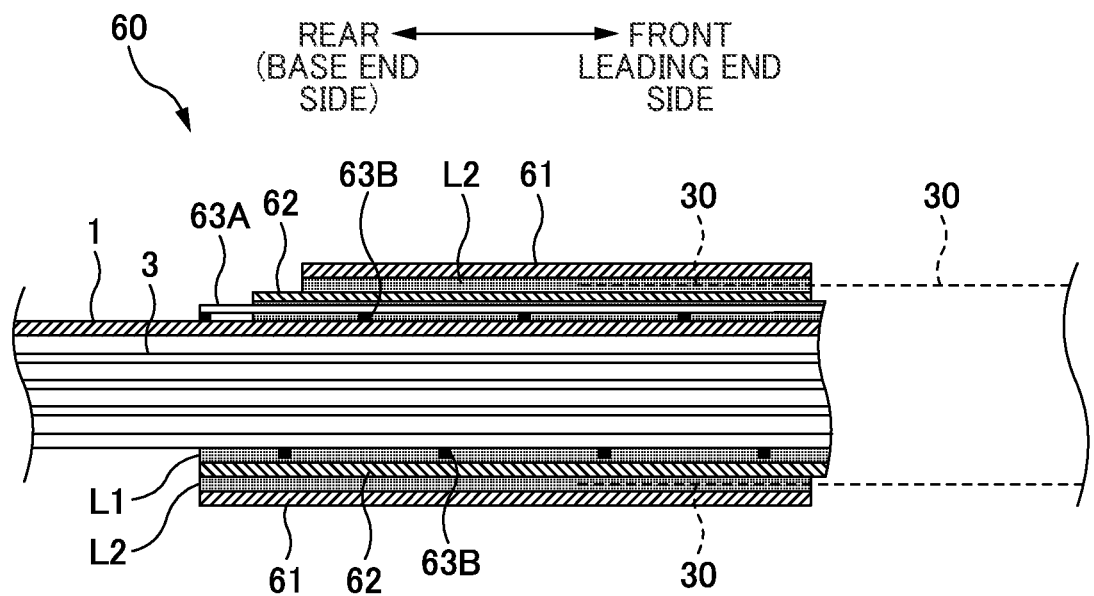
Figure 10:
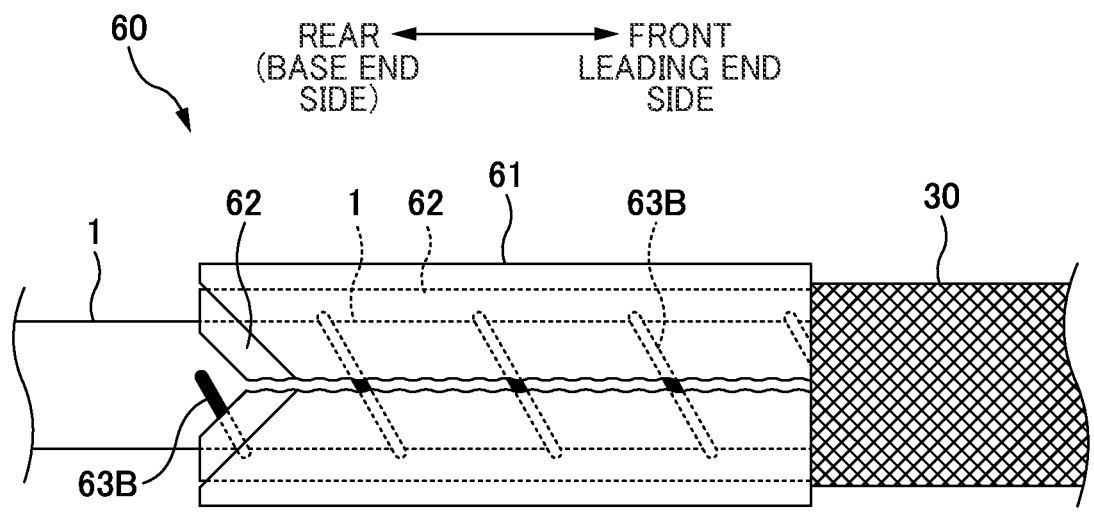
FIG. 10 is a diagram illustrating how the fixing part 60 is destroyed.

FIGS. 9A and 9B are diagrams illustrating second embodiments of the fixing part 60. FIG. 10 is a diagram illustrating how the fixing part 60 is destroyed. The fixing part 60 of the second embodiments includes an outer circumferential member 61, an intermediate member 62, a first cord member 63A, and a second cord member 63B.

As in the first embodiments, the outer circumferential member 61 is a tubular member, and is arranged so as to cover the optical cable 1 and the braided tube 30 (and the first cord member 63A and the second cord member 63B) from outside. Also in the second embodiments, the outer circumferential member 61 is constituted by, for example, a heat-shrinkable tube. The outer circumferential member 61 is constituted by a material that can be torn by the first cord member 63A.

The intermediate member 62 is arranged so as to cover the optical cable 1 from outside. The intermediate member 62 is arranged between the optical cable 1 and the outer circumferential member 61. The intermediate member 62 is constituted by a material that can be torn by the first cord member 63A. For example, the intermediate member 62 is formed by winding and bonding a tape (e.g., an aluminum tape) around the outside of the optical cable 1. The first cord member 63A and the second cord member 63B are arranged between the intermediate member 62 and the optical cable 1. The braided tube 30 is arranged between the intermediate member 62 and the outer circumferential member 61.

The first cord member 63A is a cord-like member (tearing cord) for tearing the intermediate member 62. The first cord member 63A is arranged between the intermediate member 62 and the optical cable 1. The first cord member 63A is arranged in a straight line along the length direction of the optical cable 1. Note that the first cord member 63A is arranged above the second cord member 63B. As illustrated in FIG. 10, a worker can use the first cord member 63A to tear the intermediate member 62 and the outer circumferential member 61 and destroy the fixing part 60. In this way, at the time of disassembly of the terminal structure 20 after pulling the pulling-end-equipped optical cable 100, the task of removing the braided tube 30 can be facilitated, and also the task of taking out the internally-located optical connectors 10 can be facilitated.

The second cord member 63B is a cord-like member for peeling the intermediate member 62 off from the optical cable 1. The second cord member 63B is arranged between the intermediate member 62 and the optical cable 1. The second cord member 63B is arranged in a spiral form around the outer circumference of the optical cable 1. Note that the first cord member 63A is arranged above the second cord member 63B.

As illustrated in FIG. 9B, a notch part is formed in the outer circumferential member 61 and the intermediate member 62, and a portion of the first cord member 63A (and the second cord member 63B) is exposed from the notch part. As illustrated in FIG. 10, a worker can use the first cord member 63A to tear the outer circumferential member 61 and the intermediate member 62. Providing the notch part facilitates the task of tearing the outer circumferential member 61 and the intermediate member 62 with the first cord member 63A. Note, however, that the notch part does not have to be provided in one or both of the outer circumferential member 61 and the intermediate member 62. As illustrated in FIG. 10, after the outer circumferential member 61 and the intermediate member 62 have been torn, the worker peels the intermediate member 62 (as well as the outer circumferential member 61 and the braided tube 30) off from the optical cable 1. In one or more embodiments, since the second cord member 63B is arranged in a spiral form on the outer circumference of the optical cable 1, it is easy to perform the task of peeling the intermediate member 62 and the outer circumferential member 61 off from the optical cable 1. Note, however, that the second cord member 63B does not have to be provided.

A first adhesive layer L1 is formed between the optical cable 1 and the intermediate member 62. For example, the first adhesive layer L1 is constituted by a bonding surface of the tape wrapped around the optical cable 1 for forming the intermediate member 62. Further, a second adhesive layer L2 is formed between the intermediate member 62 and the outer circumferential member 61. For example, the second adhesive layer L2 is formed by applying a hot-melt adhesive in advance to the inner circumferential surface of a heat-shrinkable tube constituting the outer circumferential member 61. In one or more embodiments, the adhesive force of the second adhesive layer L2 is greater than the adhesive force of the first adhesive layer L1. Note that "adhesive force" refers to force (peeling force) required to peel off one of two bonded members in a direction that is 90° with respect to the other member, and can be measured by a peeling test. Since the adhesive force of the first adhesive layer L1 is smaller than the adhesive force of the second adhesive layer L2, residue of the first adhesive layer L1 is less likely to remain on the outer circumference of the optical cable 1 when the outer circumferential member 61 and the intermediate member 62 are peeled off.

Note that, in both the first and second embodiments, the outer circumferential member 61 constituting the fixing part 60 is constituted by a heat-shrinkable tube. The fixing part 60, however, does not have to be made by using a heat-shrinkable tube. For example, the fixing part 60 may be constituted by using a crimping member to fix the end part of the braided tube 30 to the optical cable 1. Also note that, when disassembling the terminal structure 20 after pulling the pulling-end-equipped optical cable 100, a portion or the entirety of the fixing part 60 may remain on the optical cable 1.

As described above, the terminal structure 20 (pulling terminal structure) of one or more embodiments includes: a braided tube 30 provided with a pulling part 20A; a housing tube 40 to be arranged inside the braided tube 30; and a reinforcement member 50 to be arranged inside the braided tube 30. According to the terminal structure 20 of one or more embodiments, the reinforcement member 50 reinforces the end parts of the housing tube 40. Thus, it is possible to suppress deformation of the end parts of the housing tube 40, as illustrated in FIG. 5B, even when the pulling part 20A is pulled and tensile force is applied to the braided tube 30.

Further, the pulling-end-equipped optical cable 100 of one or more embodiments includes: an optical cable 1 including optical fibers 3; optical connectors 10 provided to an end part of the optical fibers 3; a braided tube 30 provided with a pulling part 20A; a housing tube 40 located inside the braided tube 30; a reinforcement member 50 located inside the braided tube 30; and a fixing part 60 configured to fix an end part of the braided tube 30 to the optical cable 1. According to the pulling-end-equipped optical cable 100 of one or more embodiments, the reinforcement member 50 reinforces the end parts of the housing tube 40. Thus, it is possible to suppress deformation of the end parts of the housing tube 40, as illustrated in FIG. 5B, even when the pulling part 20A is pulled and tensile force is applied to the braided tube 30.

Figure 11:
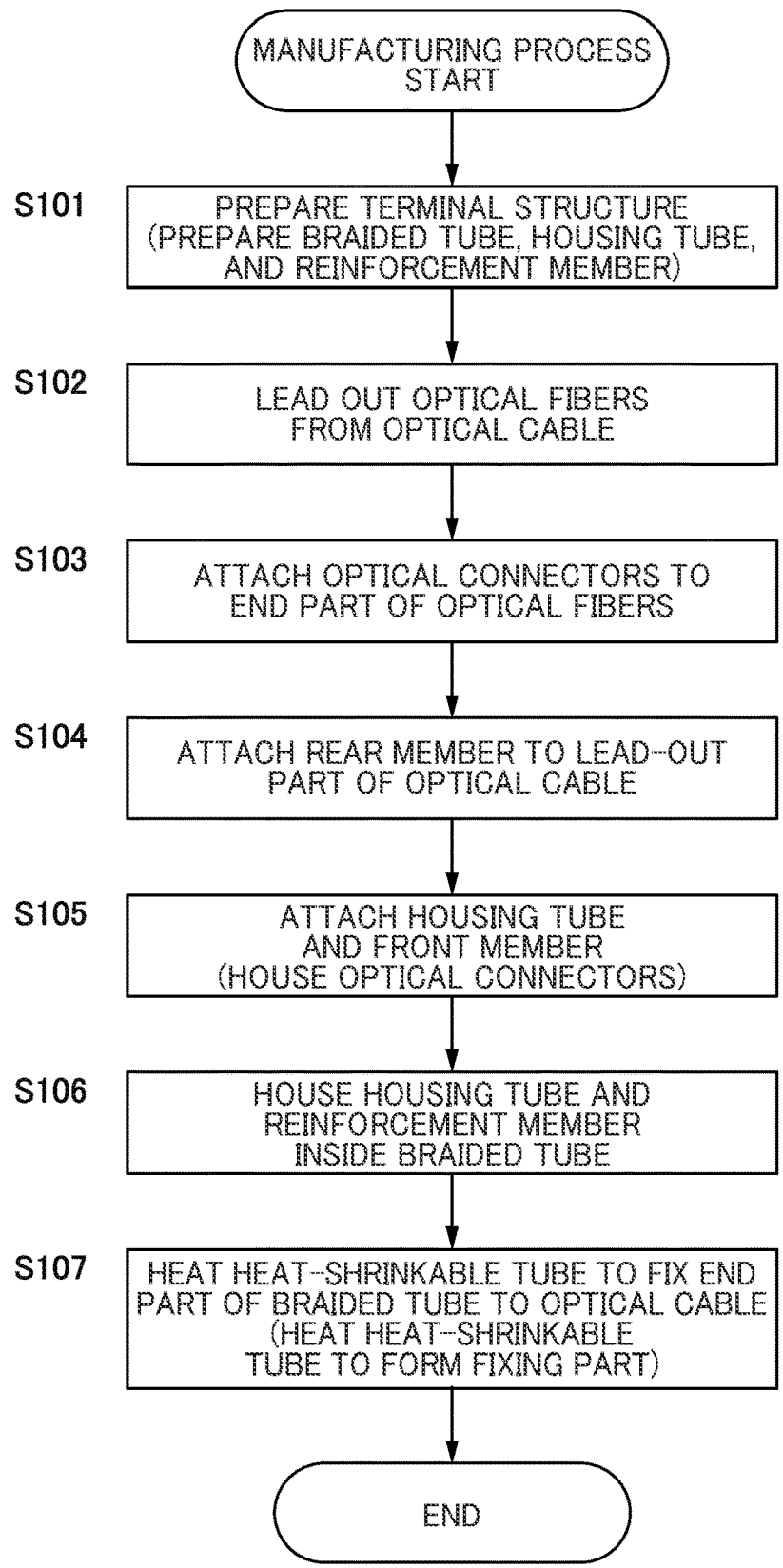
FIG. 11 is a flowchart of a method for manufacturing a pulling-end-equipped optical cable 100 according to one or more embodiments.

Method for Manufacturing Pulling-End-Equipped Optical Cable 100:

FIG. 11 is a flowchart of a method for manufacturing a pulling-end-equipped optical cable 100 according to one or more embodiments. FIGS. 12A to 12F are diagrams illustrating how the pulling-end-equipped optical cable 100 of one or more embodiments is manufactured.

First, a worker prepares the terminal structure 20 of one or more embodiments (S101). More specifically, the worker prepares the aforementioned braided tube 30, housing tube 40, and reinforcement member 50. Also, the worker prepares a heat-shrinkable tube constituting the fixing part 60. Note that the worker passes the optical cable 1 through the heat-shrinkable tube in advance.

Figure 12:
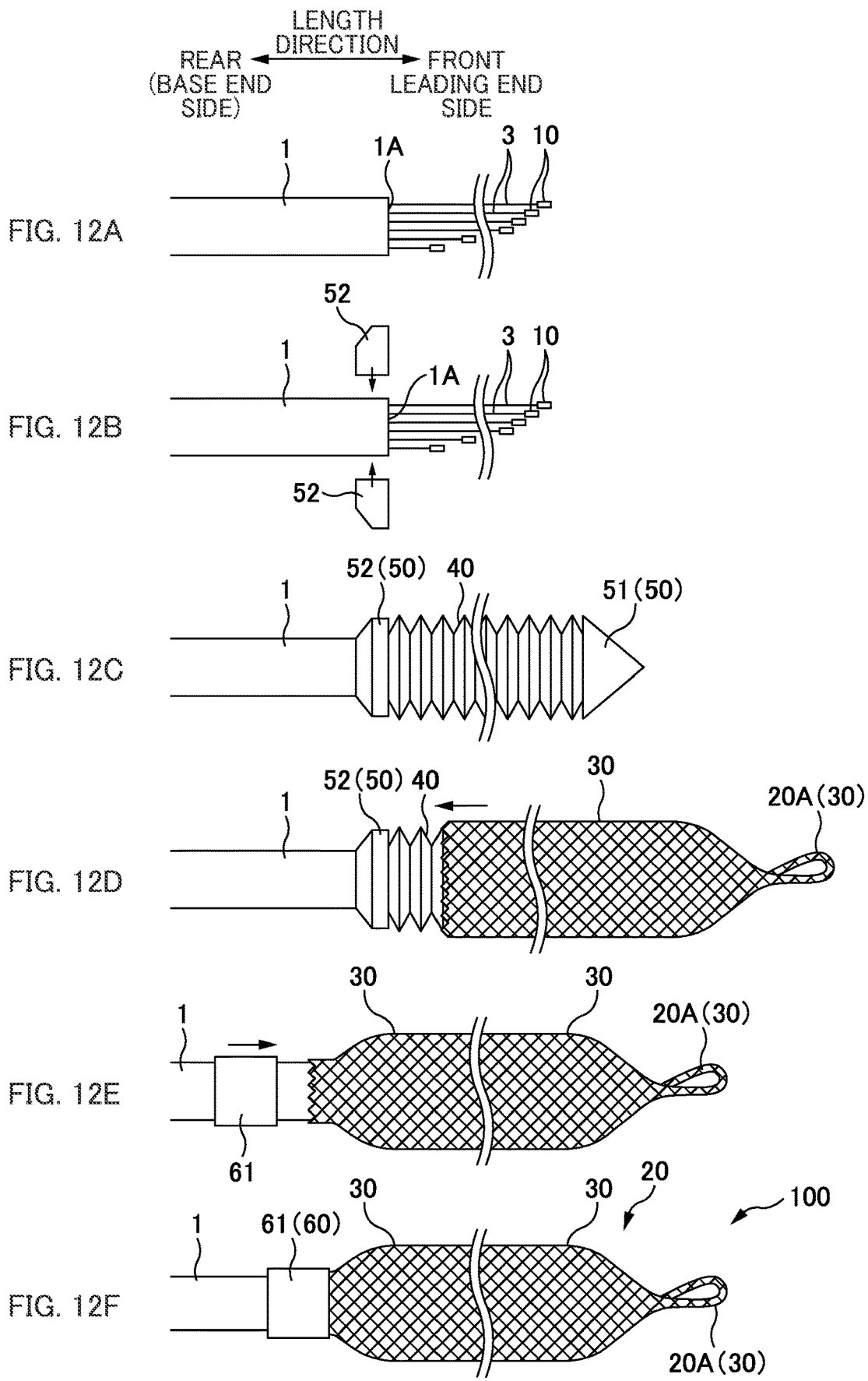
FIGS. 12A to 12F are diagrams illustrating how the pulling-end-equipped optical cable 100 of one or more embodiments is manufactured.

Next, the worker leads out the optical fibers 3 from the optical cable 1 (S102). Further, as illustrated in FIG. 12A, the worker attaches the optical connectors 10 to the end part of the optical fibers 3 leading out from the optical cable 1 (S103). Note that, if necessary, the worker may insert the optical fibers 3 (optical fiber ribbons), which lead out from the optical cable 1, through a protection tube (not illustrated), to protect the optical fibers 3.

Next, the worker attaches the rear member 52 to the lead-out part 1A of the optical cable 1 (S104). In one or more embodiments, the worker first attaches the tubular member 1B to the lead-out part 1A of the optical cable 1, and then attaches the rear member 52 to the tubular member 1B. In one or more embodiments, since the rear member 52 has a halved structure, the worker can attach the rear member 52 as illustrated in FIG. 12B, without passing the optical connectors 10 and the optical fibers 3 through the rear member 52.

Next, the worker attaches the housing tube 40 and the front member 51 (S105). At this time, as illustrated in FIG. 12C, the worker attaches the housing tube 40 such that the optical fibers 3 leading out from the optical cable 1, as well as the optical connectors 10 provided to the end part of the optical fibers 3, are housed inside the housing tube 40. Further, the worker attaches the reinforcement member 50 (the front member 51 and the rear member 52) to both ends of the housing tube 40. In this way, the end parts of the housing tube 40 are reinforced. Further, at this time, the worker applies a sealing treatment (i.e., forms a sealing part) between the housing tube 40 and the reinforcement member 50 (the front member 51 and the rear member 52). In this way, the inside (housing space) of the housing tube 40 can be made watertight, and the optical connectors 10 can be waterproofed.

Next, the worker houses the housing tube 40 and the reinforcement member 50 inside the braided tube 30 (S106). At this time, as illustrated in FIG. 12D, the worker slides the braided tube 30 over the housing tube 40 and the reinforcement member 50 from the front side, to arrange the housing tube 40 and the reinforcement member 50 inside the braided tube 30.

Finally, the worker fixes the end part of the braided tube 30 to the optical cable 1 (S107). More specifically, as illustrated in FIG. 12E, the worker arranges the end part of the braided tube 30 onto the outer circumference of the optical cable 1 and also slides the heat-shrinkable tube, which has been provided on the optical cable 1 in advance, over the end part of the braided tube 30, to arrange the end part of the braided tube 30 between the optical cable 1 and the heat-shrinkable tube. Further, the worker applies an adhesive between the optical cable 1 and the heat-shrinkable tube. Note that, before arranging the end part of the braided tube 30 onto the outer circumference of the optical cable 1, the worker may arrange cord members (the first cord member 63A and the second cord member 63B) on the outer circumference of the optical cable 1 and then wrap a tape thereover, to form the intermediate member 62. In this case, the worker arranges the end part of the braided tube 30 onto the outer circumference of the intermediate member 62 and then slides the heat-shrinkable tube over the end part of the braided tube 30, to arrange the end part of the braided tube 30 between the intermediate member 62 and the heat-shrinkable tube. After arranging the end part of the braided tube 30 inside the heat-shrinkable tube, the worker heats the heat-shrinkable tube. In this way, as illustrated in FIG. 12F, the fixing part 60 is formed, and the end part of the braided tube 30 is fixed to the optical cable 1. In this way, manufacturing of the pulling-end-equipped optical cable 100 is completed.

As described above, the manufacturing method of one or more embodiments involves: a step of attaching optical connectors 10 to an end part of optical fibers 3 led out from an optical cable 1 (S103); a step of housing the optical connector 10 inside a housing tube 40 and attaching a reinforcement member 50 to the housing tube 40 (S105); a step of arranging the housing tube 40 and the reinforcement member 50 inside a braided tube 30 (S106); and a step of fixing an end part of the braided tube 30 to the optical cable 1 (S107). In this way, it is possible to manufacture a pulling-end-equipped optical cable 100 capable of suppressing deformation of an end part of the housing tube 40.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical cable
1A: Lead-out part
1B: Tubular member
2: Optical fiber unit
3: Optical fiber
4: Outer sheath
5: Wrapping tape
6: Tension member
7: Rip cord
10: Optical connector
20: Terminal structure (pulling terminal structure)
20A: Pulling part
30: Braided tube
40: Housing tube 50: Reinforcement member
51: Front member
51A: Fitting part
51B: Step part
51C: Tapered part
52: Rear member
52A: Fitting part
52B: Step part
52C: Tapered part
52D: Attachment part
60: Fixing part
61: Outer circumferential member
62: Intermediate member
63A: First cord member
63B: Second cord member
L: Adhesive layer
L1: First adhesive layer
L2: Second adhesive layer
100: Pulling-end-equipped optical cable

The invention claimed is:

1. A pulling terminal structure comprising:
a braided tube that comprises a pulling part;
a housing tube disposed inside the braided tube and that houses an optical connector; and
a reinforcement member disposed inside the braided tube and that reinforces an end part of the housing tube, wherein
the pulling part is disposed at a first end part of the braided tube,
the pulling terminal structure further comprises a fixing part that fixes the braided tube to an optical cable at a second end part of the braided tube that is opposite to the first end part,
the fixing part comprises a tubular outer circumferential member,
the outer circumferential member and the optical cable sandwich the second end part of the braided tube,
the fixing part further comprises an intermediate member between the optical cable and the outer circumferential member,
the outer circumferential member and the intermediate member sandwich the second end part of the braided tube,
a first adhesive layer is disposed between the optical cable and the intermediate member,
a second adhesive layer is disposed between the intermediate member and the outer circumferential member, and
an adhesive force of the second adhesive layer is greater than an adhesive force of the first adhesive layer.

2. The pulling terminal structure according to claim 1, wherein the reinforcement member comprises a fitting part that fits the housing tube.

3. The pulling terminal structure according to claim 2, wherein the reinforcement member comprises a step part that covers the end part of the housing tube from outside in a length direction.

4. The pulling terminal structure according to claim 1, wherein the reinforcement member comprises a tapered part that tapers away from the housing tube.

5. The pulling terminal structure according to claim 1, wherein an outer diameter of the reinforcement member is larger than an outer diameter of the housing tube.

6. The pulling terminal structure according to claim 1, wherein waterproofing sealing treatment is applied between the housing tube and the reinforcement member.

7. The pulling terminal structure according to claim 1, further comprising a cord member between the optical cable and the intermediate member.

8. A pulling-end-equipped optical cable comprising:
an optical cable comprising an optical fiber;
an optical connector at an end part of the optical fiber;
a braided tube that comprises a pulling part disposed at a first end part of the braided tube;
a housing tube disposed inside the braided tube and that houses the optical connector;
a reinforcement member disposed inside the braided tube and that reinforces an end part of the housing tube; and
a fixing part that fixes the braided tube to the optical cable at a second end part of the braided tube that is opposite to the first end part, wherein
the fixing part comprises a tubular outer circumferential member,
the outer circumferential member and the optical cable sandwich the second end part of the braided tube,
the fixing part further comprises an intermediate member between the optical cable and the outer circumferential member,
the outer circumferential member and the intermediate member sandwich the second end part of the braided tube,
a first adhesive layer is disposed between the optical cable and the intermediate member,
a second adhesive layer is disposed between the intermediate member and the outer circumferential member, and
an adhesive force of the second adhesive layer is greater than an adhesive force of the first adhesive layer.

9. A method for manufacturing a pulling-end-equipped optical cable, the method comprising:
attaching an optical connector to an end part of an optical fiber led out from an optical cable;
housing the optical connector inside a housing tube;
attaching a reinforcement member to the housing tube;
arranging the housing tube and the reinforcement member inside a braided tube comprising a pulling part disposed at a first end part of the braided tube; and
fixing, to the optical cable, a second end part of the braided tube opposite to the first end part of the braided tube, wherein
the fixing of the braided tube to the optical cable comprises:
forming a first adhesive layer disposed between the optical cable and an intermediate member;
sandwiching the second end part of the braided tube between the intermediate member and a tubular outer circumferential member; and
forming a second adhesive layer disposed between the intermediate member and the outer circumferential member, wherein an adhesive force of the second adhesive layer is greater than an adhesive force of the first adhesive layer.

* * * * *